United States Patent
Bauer

[15] 3,648,999
[45] Mar. 14, 1972

[54] SUSPENSION SPRING

[72] Inventor: James A. Bauer, Monroeville, Pa.
[73] Assignee: Westinghouse Electric Corporation, Pittsburgh, Pa.
[22] Filed: Dec. 19, 1969
[21] Appl. No.: 886,694

[52] U.S. Cl. ............................................................267/160
[51] Int. Cl. ...................................................F16f 1/34
[58] Field of Search ...........................267/159, 160, 161, 163

[56] References Cited

UNITED STATES PATENTS 2,753,544   7/1956   Cox et al..................................267/159

Primary Examiner—James B. Marbert
Attorney—A. T. Stratton, F. P. Lyle and F. Cristiano, Jr.

[57] ABSTRACT

This invention provides a spring which may be used to seismically support a movable shaft. The spring comprises an outer mounting ring and a concentric inner mounting plate connected to each other by a plurality of links having outer and inner hinge sections, pairs of reinforcing flanges, and linking flanges. The plurality of equally spaced links projects into the mounting ring at equal angles. The outer hinge portions of the links connect the links to the mounting ring. A pair of reinforcing flanges increases the natural frequency of the spring. At the end of the reinforcing flanges are the inner hinge portions of the links connecting the links to the linking flanges; the linking flanges connect the links to the center mounting plates and are integral therewith. The reinforcing and linking flanges are in planes normal to the planes containing the center mounting plate, the links, and the ring insuring a rectilinear spring deflection characteristic.

9 Claims, 5 Drawing Figures

PATENTED MAR 14 1972 3,648,999

WITNESSES
Theodore F. Wrobel
Bruce L. Samlan

INVENTOR
James A. Bauer

BY

SUSPENSION SPRING

BACKGROUND OF THE INVENTION

This invention relates generally to a mounting spring which seismically supports a movable shaft such as a moving coil.

In copending application Ser. No. 1,354, filed on Jan. 8, 1970 by James A. Bauer and D. V. Wright, assigned to the same assignee as this invention, there is shown a vibration pickup device used to measure vibrations, for example, vibrations caused by unbalanced rotors. A movable coil is mounted seismically inside of the device on springs secured to the casing of the device. The springs used could advantageously be the seismic mounting springs in this disclosure. Previously, spiral springs were used as the seismic mounting springs in vibration pickup devices. The typical range of the self-exciting natural frequencies of the spiral springs was between 52 and 120 cycles per second. With the normal operating frequency range of the pickup device, it was common to have between 15 to 20 frequency modes in which the spiral springs were excited by the vibrating device creating a resonant condition commonly called "spring buzz." In a device measuring vibration of a rotary object, the added vibrations caused by the spring would cause an inaccurate reading.

Another problem with springs commonly used was that the amount of damping in the springs was small. Therefore, the amplitude of vibration of the spring was correspondingly large when a small excitation is applied at the natural frequency of the spring, i.e., the smaller the amount of damping the larger the amplitude of the vibration. In many cases, especially during a resonant condition, the springs would crash into the stops and were often stretched beyond their elastic range resulting in inaccurate readouts. In some cases, spring failure actually resulted.

It would be desirable then to design an economical spring which would support a shaft. It would also be desirable for the spring to have a natural frequency well beyond the operating frequency range of the device in which the spring will be used. It would further be desirable to have a spring having a large damping characteristic.

SUMMARY OF THE INVENTION

This invention comprises a spring mounted in a device which will seismically support a shaft. The spring comprises an outer mounting ring which is circular in a plan view. A plurality of links project into the ring and are spaced equally from each other at the same angle with the outer ring. On each link is a pair of reinforcing flanges, one flange being on each side. Each link has an outer flexible hinge portion and an inner flexible hinge portion. The outer hinge portion connects the link to the outer mounting ring. On the inner end of the link is an inner hinge portion. Each inner hinge portion is secured to a center mounting plate through a linking flange, the plate being concentric with the outer mounting ring. The reinforcing and linking flanges are in planes normal to the plane containing the center mounting plate, the links and the ring.

The reinforcing flanges on each link insure that the link acts as a rigid member between the reinforcing flanges but still allows the reinforced section to rotate about the outer and inner hinge sections. The effect of the reinforcing flanges is to increase the stiffness of the link, thereby increasing the natural frequency of the spring. Tests have shown that the natural frequency of the spring with the reinforcing and linking flanges is approximately 720 cycles per second, well beyond the range of operating frequencies of a vibration pickup device. Since the linking flange is normal to the plane in which the center mounting plate, the links, and the outer ring lie, as the links deflect, the linking flanges act as rigid links between the links and the center mounting plate insuring linear movement in the axial direction. However, in the horizontal direction, the flanges can deflect to minimize the torque applied on the center mounting plate. Additionally, the spring can be made from one piece of material, all parts being integral.

This disclosure, then, reveals a spring which can be made from one piece of sheet material and which has a natural frequency beyond the operating frequency of the device in which the spring is used. The spring gives a linear deflection in the axial direction.

DESCRIPTION OF THE PREFERRED EMBODIMENT

Figure 1:
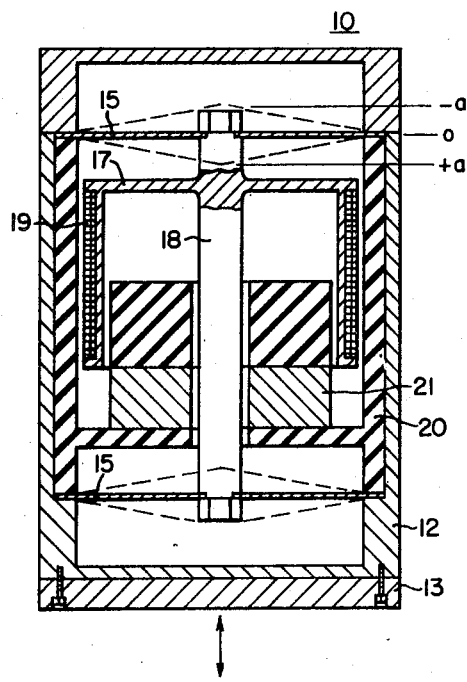
FIG. 1 is an axial sectional view of a device having a shaft supported by a pair of seismic mounting springs formed in accordance with the present invention.

Referring to the drawings in detail, and particularly to FIG. 1, a representative view of a vibration pickup device 10, used to measure the amplitude of vibration from a rotary body, is shown. The pickup device 10 may be of well known type and comprises a tubular outer casing portion 12 secured to a base 13. A pair of seismic mounting springs 15 formed in accordance with the invention are mounted inside of the outer casing 12. An inner tubular coil structure 17, having a central rigid shaft portion 18 and wound coils 19 is seismically secured by fastening means to the center of the mounting springs 15. A tubular magnet frame 20 supports a disc-shaped permanent magnet 21 within the outer casing 12, the magnet frame being in encompassing spaced relation with the inner coil structure 17.

As well known in the art, as the inner coil structure 17 moves through the magnetic field created by the permanent magnet 21, or as the permanent magnetic field moves and is cut by the stationary inner coil structure, an alternating current will be produced in coils 19 which will be proportional to the velocity of the moving body which if the motion is sinusoidal is proportional to the product of the displacement and the frequency of vibration. The base 13 may be mounted directly on a vibrating body (not shown), or a probe (not shown) may be secured to the rigid shaft portion 19 of the inner coil structure 17 to transmit a vibratory motion from a vibrating body in the axial direction, as indicated by the arrow. It is understood that the pickup device 10 comprises no part of the invention.

Figure 3:
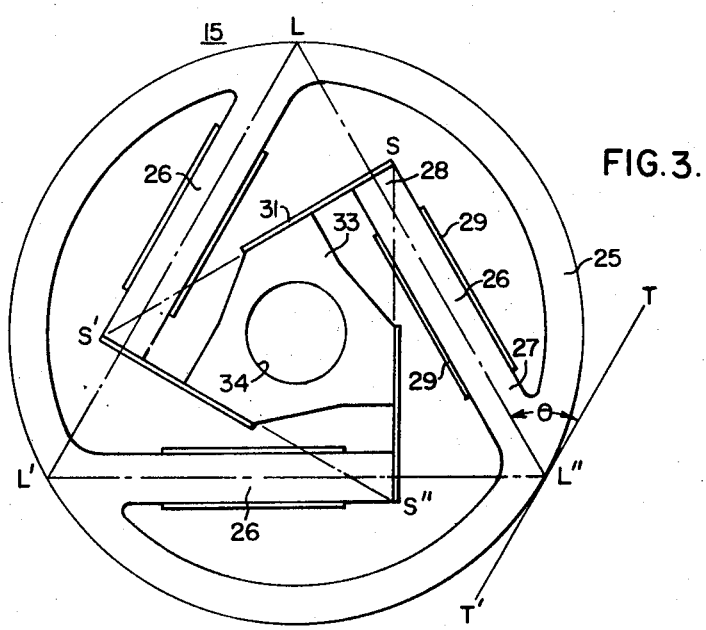
FIG. 3 is a plan view of the spring shown in FIG. 2 and on approximately the same scale.
Figure 2:
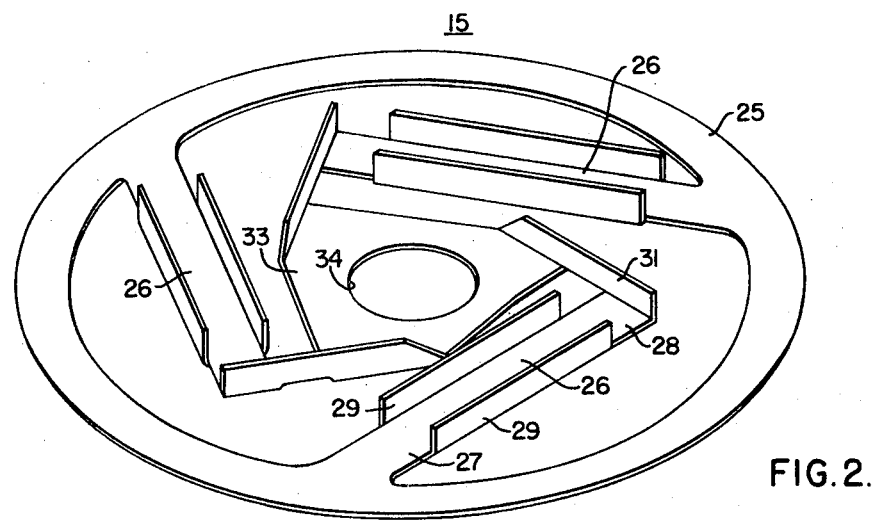
FIG. 2 is an enlarged isometric view of one of the seismic mounting springs shown in FIG. 1.

Referring to FIG. 2, the seismic mounting spring 15 comprises an outer mounting ring 25 which is circular in shape (FIG. 3). Projecting inwardly from the outer ring 25 are three links 26. The links 26 are similar in size and shape and are symmetrically oriented within the ring 25. The links 26 are inclined at an angle $\theta$ with ring 25 where $\theta$ is the angle made by the intersection of the tangent T,T' on the outer mounting ring 25 with a line L,L" which represents the centerline of the links 26, as best seen in FIG. 3.

Each link 26 can be divided into three portions: an outer hinge portion 27, an inner hinge portion 28 and a pair of parallel reinforcing flanges 29. Only one link will be described since the links are substantially the same. The outer hinge portion 27 connects the link 26 to the outer ring 25 and is the portion where most of the bending will occur. The pairs of reinforcing flanges 29, one being on each side of the link 26 and integral therewith, and the ring 25 define the boundaries of the outer hinge portion 27. The reinforcing flanges 29 are on planes normal to a plane containing the link 26 and the ring 25. The flanges 29 are rectangularly shaped and define a channel of U-shaped cross section to the link 26, thus the portion of the link 26 between the reinforcing flanges 29 is stiffened and acts as a rigid body. At the end of the reinforcing flanges 29 is the inner hinge section 28. At the other end of the inner hinge section 28 and further defining the hinge 28 is a linking flange 31 fastened to the link 26 at the inner hinge section. The linking flange 31 is in a plane normal to a plane containing the link 26 and the ring 25 and is integral therewith. At the opposite end of the linking flange 31 is a center mounting plate 33, the plate being integral with the flanges 31, the links 26 and the ring 25. The center mounting plate 33 is irregularly shaped, so that the spring 15 can be made from one piece of material, and has a circular aperture 34 in its center to receive a rigid shaft 18 (FIG. 1). The center mounting plate 33 and the outer mounting ring 25 are concentric with each other.

The links 26 each form a portion of a leg of a first equilateral triangle L,L', L''. Furthermore, the linking flanges 31 each form a leg of a second but smaller equilateral triangle S,S', S''. The two equilateral triangles L,L', L'' and S,S', S'' are concentrically arranged relative to each other. The smaller triangle S,S', S'' is rotated through a central angle relative to the larger triangle L,L', L''. Each leg of the smaller triangle S,S', S'' intersects two adjacent legs on the larger triangle L,L', L''. For example, S,S' intersects L,L' and L,L''.

As previously mentioned, the main problem with prior flat mounting springs was that the natural frequency of the springs was so low that the springs would be excited by the vibrating device in which they were mounted. By adding reinforcing flanges 29 to each link 26 the natural frequency of the spring 15 was increased. In fact, as previously mentioned, the frequency of the spring was increased from the range of 52 to 120 cycles per second to approximately 720 cycles per second. In addition, these reinforcing flanges 29 are designed so that they are integral with the seismic mounting spring 15 and are constructed from the same metallic sheet. However, the problem encountered in early spring designs was that the spring was acting in a highly nonlinear manner.

Figure 4:
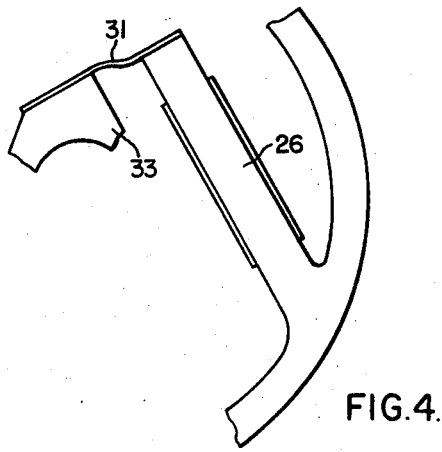
FIG. 4 is a view showing a portion of the spring in a deflected position.
Figure 5:
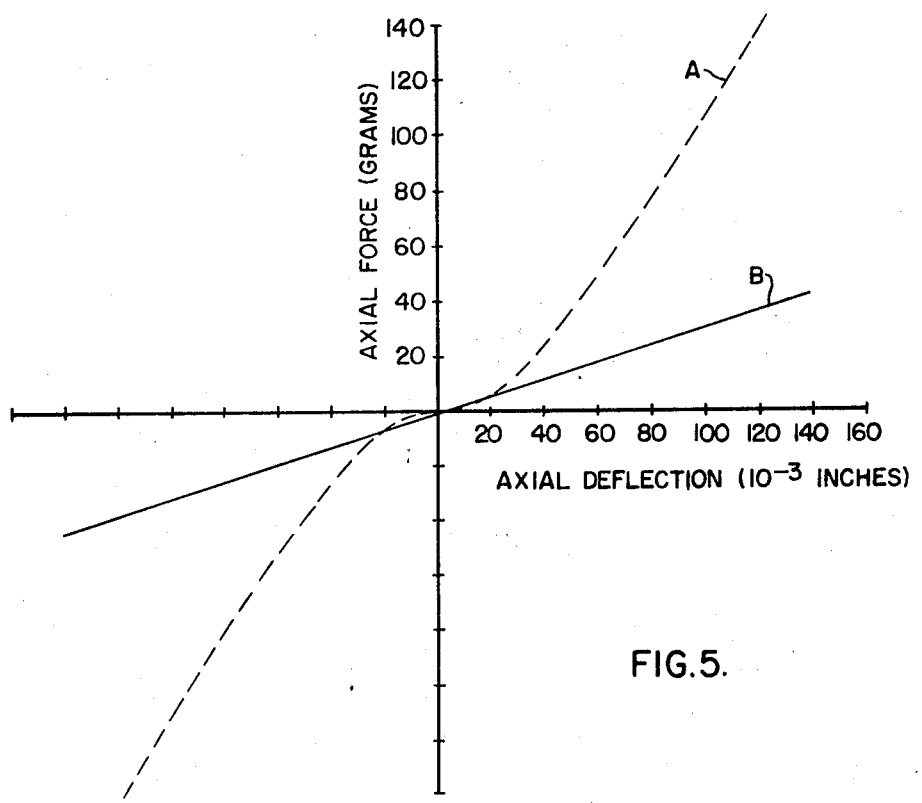
FIG. 5 is a graph comparing the deflection characteristic of a spring formed in accordance with the invention with the deflection characteristic of a previously proposed spring.

For example, in FIG. 5, test results for a typical proposed spring which operated in a nonrectilinear manner are shown by the dashed line A where the abscissa represents axial deflection in thousandths of an inch and the ordinate represents axial force in grams. Each unit of deflection is 0.020 inches and each unit of force is 20 grams. Although the proposed springs were similar in many respects, there were problems which created nonrectilinear force displacement characteristics. For example in FIG. 5, a force of 4 grams produced a deflection of $14 \times 10^{-3}$ inches and 12 grams produced $30 \times 10^{-3}$ inches of deflection. By bending the linking flanges 31 into a plane normal to the plane containing the center mounting plate 33, the links 26, and the ring 25, i.e., in an axial direction, the flanges 31 were best able to resist deflection in the axial direction. Additionally, when the flange 31 was in the horizontal position, as the link 26 rotated from a zero position, as shown in FIG. 1, to its maximum deflection point $+a$ or $-a$, the flange 31 would also tend to move downward or upward and exert a torque of sufficient magnitude on the center mounting plate 33 to cause substantial rotation of the center mounting plate 33. Since there are three linking flanges 31, this torque was exerted in the same direction by a factor of three. With the linking flanges 31 in the axial direction, however, the flanges 31 bend, as indicated in FIG. 4, when the link 26 is deflected. This bending of the linking flange 31 minimizes the torque exerted on the center mounting plate 33 so that a minimum of rotation occurs.

Furthermore, the flanges 31 are strong in the axial direction, acting as a rigid link between the plate 31 and the links 26 and resulting in an approximately linear spring characteristic as represented by the solid line B in FIG. 5. For example, 6 grams of force created a $20 \times 10^{-3}$ inch deflection and 12 grams a $40 \times 10^{-3}$ inch deflection, etc.

In the vibration pickup device 10 shown in FIG. 1, two springs 15 are used on opposite ends of the inner coil structure 17. The two springs face each other in an inverted relation so that the reinforcing flanges 29 and the linking flanges 31 project towards each other. The angle $\theta$ the links make with the tangent T-T' to the ring 25 in the bottom spring 15 (FIG. 3) are equal and opposite to the angle $\theta$ on the top spring 15. This is commonly referred to as "opposite hand springs." Although there will be a slight torque exerted on each end of the rigid shaft portion 19, the torques will be equal to each other but in opposite directions so that the resultant torque on the inner coil structure 17 is zero. By minimizing the equal but opposite torques, only very small twisting forces are imposed on the rigid shaft portion 18.

The springs 15 are designed so that all of the components of the spring can be made from one thin sheet of spring material. The actual material is selected so as to have a large elastic range such as beryllium copper, inconel, and phosphor bronze. The spring can be fabricated by a photoetching process or stamping process. The reinforcing flanges 29 and the linking flanges 31 are bent so that they are in planes normal to the plane containing the center mounting plate 33, the links 26, and the outer mounting ring 25.

It will now be seen that the invention comprises a seismic mounting spring fabricated from one piece of material having a very high natural frequency (on the order of 720 cps) and having a rectilinear spring characteristic (FIG. 5).

Although the invention has been shown in only one form, it will be obvious to those skilled in the art that it is not so limited but is susceptible of various changes and modifications without departing from the spirit thereof. Furthermore, although 720 c.p.s. has been specified as the frequency of the spring, this frequency is not critical since the frequency is well beyond the operating frequency of the device in which is operates.

What is claimed is:

1. A seismic mounting spring comprising
an outer mounting ring,
a center mounting plate concentric with said ring,
a plurality of links projecting into said ring,
each of said links being comprised of an outer axial hinge portion, an inner axial hinge portion and a rigid portion, said portions being integral with each other,
said outer hinge portion connecting said rigid portion with said outer mounting ring,
said inner hinge portion connecting said rigid portion with said center mounting plate,
said rigid portion connecting said inner and outer hinge portions,
a plurality of linking flanges,
one end of said linking flanges being secured to the inner hinge portion of said links, and the other end of said linking flanges being secured to said center mounting plate.

2. A seismic mounting spring comprising
an outer mounting ring,
a center mounting plate concentric with said ring,
a plurality of links projecting into said ring,
each of said links having an outer axial hinge portion, an inner axial hinge portion, and a rigid portion,
said rigid portion being in spaced relation with said outer ring and connected thereto by said outer hinge portion,
said rigid portion comprising a pair of reinforcing flanges, one flange of each pair being disposed on opposite sides of each link,
a plurality of linking flanges,
one end of said linking flanges being secured to the inner hinge portion of said links, and the other end of said linking flanges being secured to the center mounting plate.

3. The structure according to claim 2 wherein the ring is circular in plan and the links are equally spaced from each other in a circumferential direction.

4. The structure defined in claim 2 wherein the links project into the ring at an acute angle $\theta$, where $\theta$ is the angle formed by the intersection of the center line of the link and a tangent to a point on the mounting ring.

5. The structure according to claim 2, wherein the reinforcing flanges are approximately rectangular in plan and are in planes normal to a plane in which the ring, the links and the center mounting plate lie.

6. The structure according to claim 2, wherein the linking flanges are integral with the spring.

7. The structure according to claim 2, wherein the linking flanges are approximately rectangular in plan and are in planes normal to a plane in which the ring, the links, and the center mounting plate lie.

8. The structure according to claim 2 wherein said spring has a substantially rectilinear force displacement characteristic.

9. The structure according to claim 8, wherein the rectilinear force displacement characteristic is substantially shown as the solid line B indicated in FIG. 5.

* * * * *